United States Patent [19]

Benson

[11] 4,454,426
[45] Jun. 12, 1984

[54] LINEAR ELECTROMAGNETIC MACHINE

[75] Inventor: Glendon M. Benson, Danville, Calif.

[73] Assignee: New Process Industries, Inc., Minneapolis, Minn.

[21] Appl. No.: 293,825

[22] Filed: Aug. 17, 1981

[51] Int. Cl.³ .......................................... H02K 33/00
[52] U.S. Cl. ........................................ 290/1 R; 310/15
[58] Field of Search ................... 290/1 R; 310/12–15

[56] References Cited

U.S. PATENT DOCUMENTS

| | | |
|---|---|---|
| 637,809 | 11/1899 | Meissner . |
| 814,083 | 3/1906 | Ryder . |
| 1,621,469 | 3/1927 | Remy . |
| 1,785,643 | 12/1930 | Noack et al. . |
| 2,362,151 | 11/1944 | Ostenberg ............................ 290/1 |
| 2,842,688 | 7/1958 | Martin ................................. 310/15 |
| 2,928,959 | 3/1960 | Christian ............................. 310/15 |
| 2,944,160 | 7/1960 | Dinckinson ............................ 290/1 |
| 2,992,342 | 7/1961 | Schmidt et al. ..................... 310/15 |
| 3,024,374 | 3/1962 | Stauder ............................... 310/15 |
| 3,094,635 | 6/1963 | Wysocki ............................. 310/12 |
| 3,105,153 | 9/1963 | James, Jr. ............................. 290/1 |
| 3,206,609 | 9/1965 | Dawes ................................. 290/1 |
| 3,234,395 | 2/1966 | Colgate ............................... 290/1 |
| 3,247,406 | 4/1966 | Toësca .......................... 290/1 R X |
| 3,349,247 | 10/1967 | Birkestrand ...................... 290/1 R |
| 3,443,111 | 5/1969 | Monpetit et al. ...................... 290/1 |
| 3,465,161 | 9/1969 | Cutkosky ............................. 290/1 |
| 3,484,616 | 12/1969 | Baumgardner et al. ............... 290/1 |
| 3,629,596 | 12/1971 | Wills ................................... 290/1 |
| 3,675,031 | 7/1972 | Lavigne ............................... 290/1 |
| 3,783,302 | 1/1974 | Woodbridge ........................ 290/42 |
| 4,036,018 | 7/1977 | Beale ................................. 60/520 |
| 4,349,757 | 9/1982 | Bhate ................................. 310/15 |

FOREIGN PATENT DOCUMENTS 1406682  6/1965  France .

Primary Examiner—B. Dobeck
Assistant Examiner—W. E. Duncanson, Jr.
Attorney, Agent, or Firm—Townsend and Townsend

[57] ABSTRACT

A linear electromagnetic machine has a stator with a coil mounted thereon. A reciprocating element has permanent magnet segments of alternating polarity so that reciprocation of said element relative to said stator in an axial direction causes periodic flux reversal through the coil to induce an alternating voltage therein. The magnetized segments are of equal axial extent and are axially spaced by transitional regions that are of axial extent substantially less than that of the magnetized segments. Flux return and core elements associated with the stator provides a relatively low reluctance magnetic path for flux lines resulting from magnetization of the permanent magnets wherein the reluctance is generally independent of the position of the reciprocating element.

17 Claims, 21 Drawing Figures

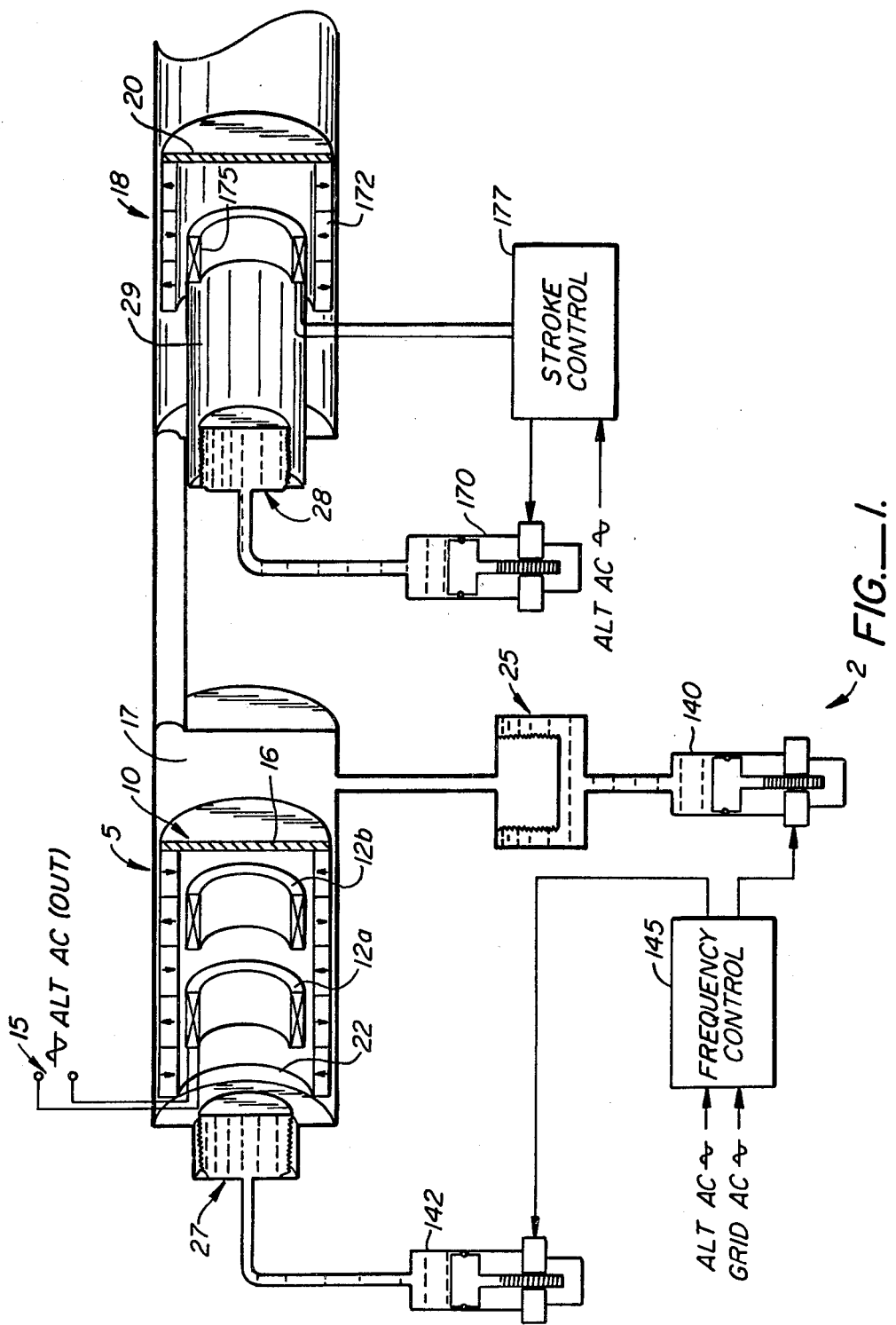
FIG._1.

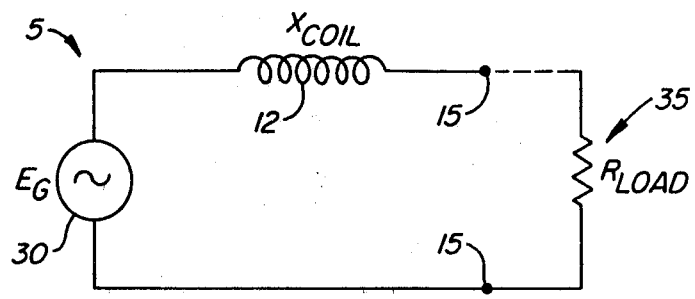
FIG._2A.
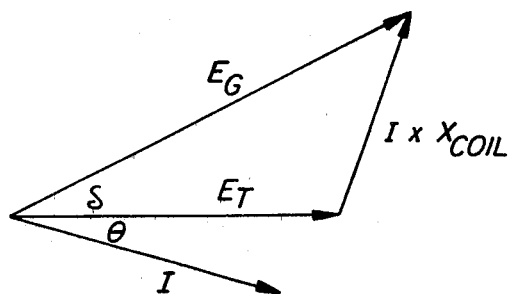
FIG._2B.
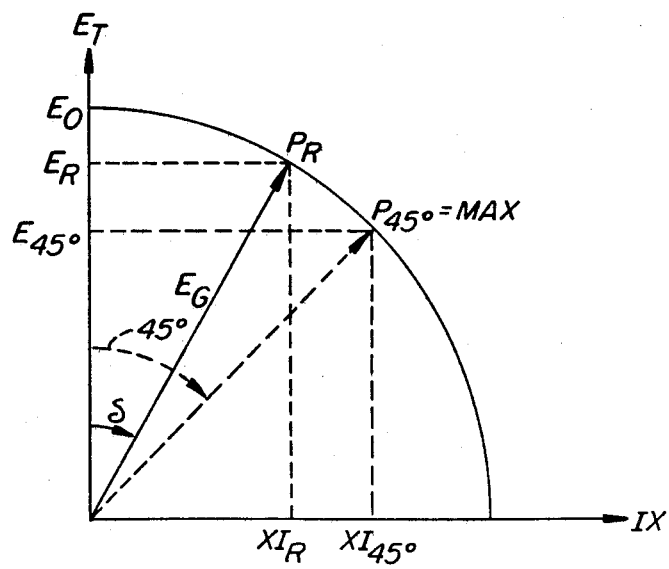
FIG._2C.

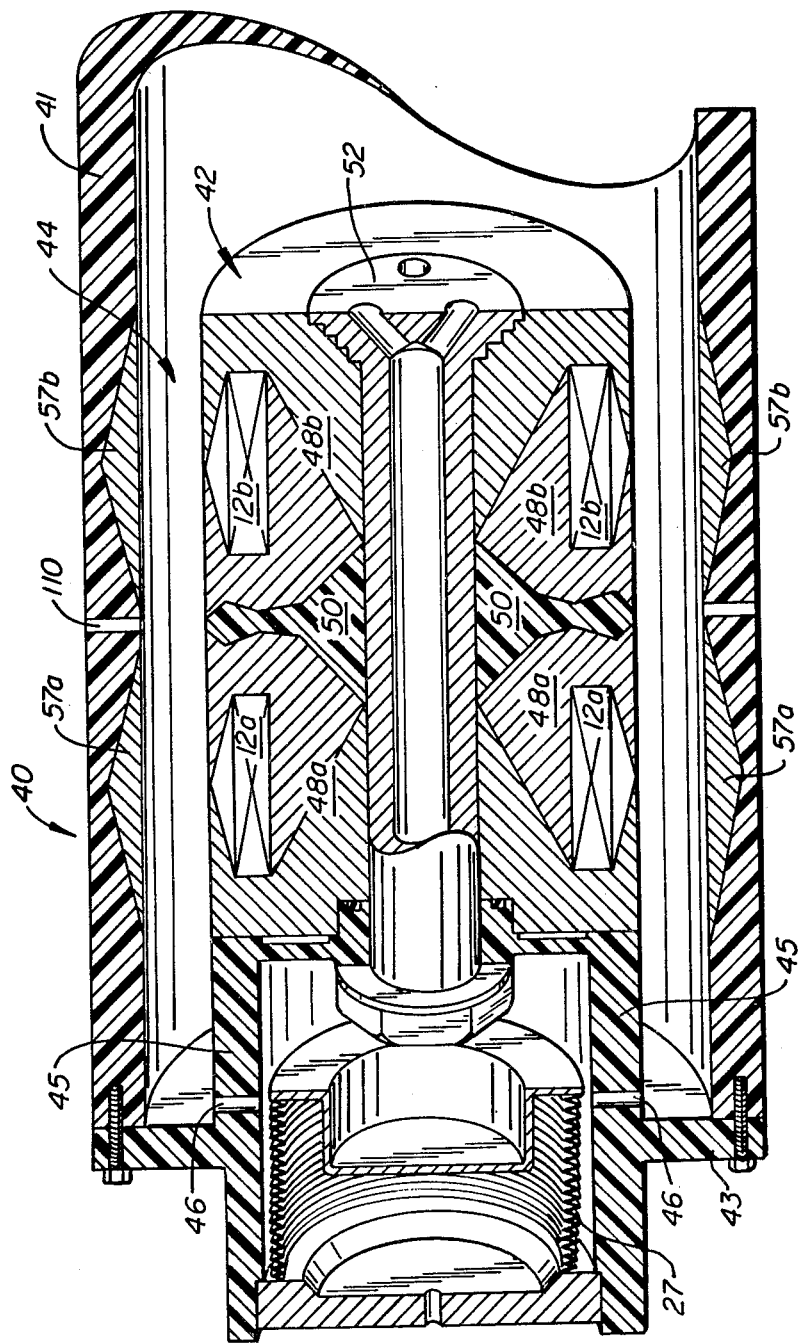

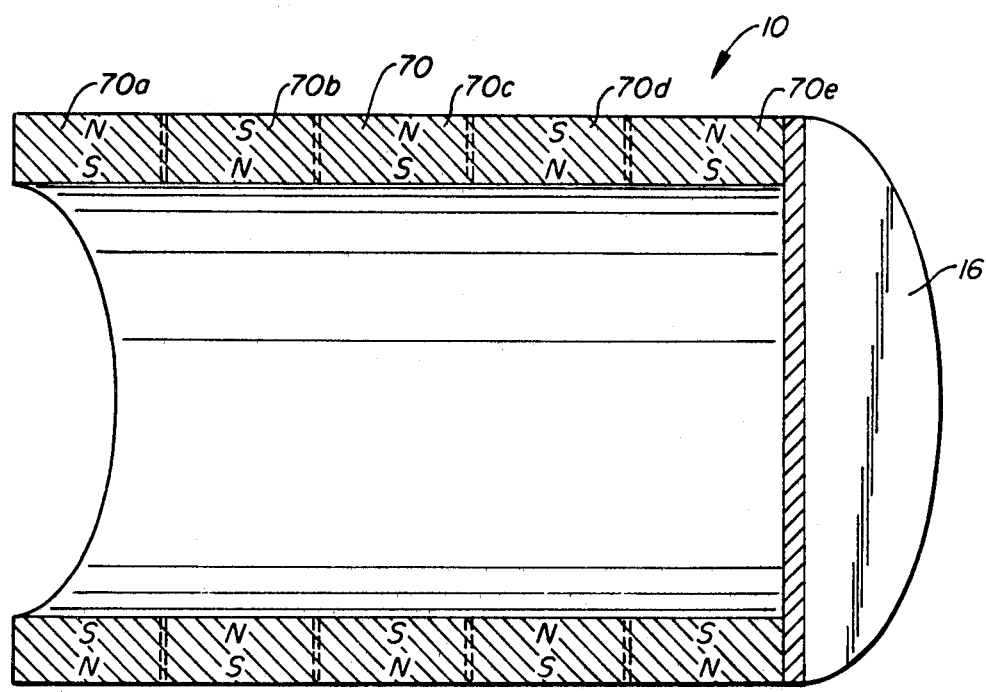
FIG._4.
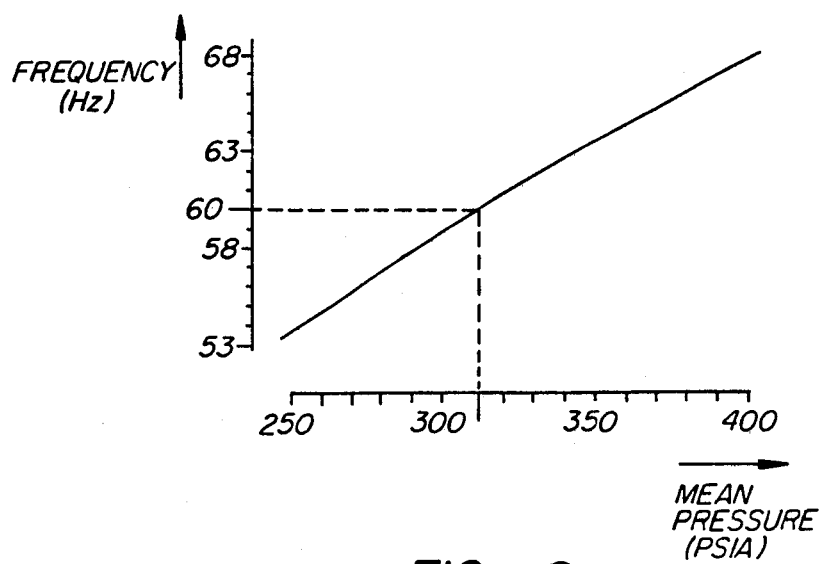
FIG._8.

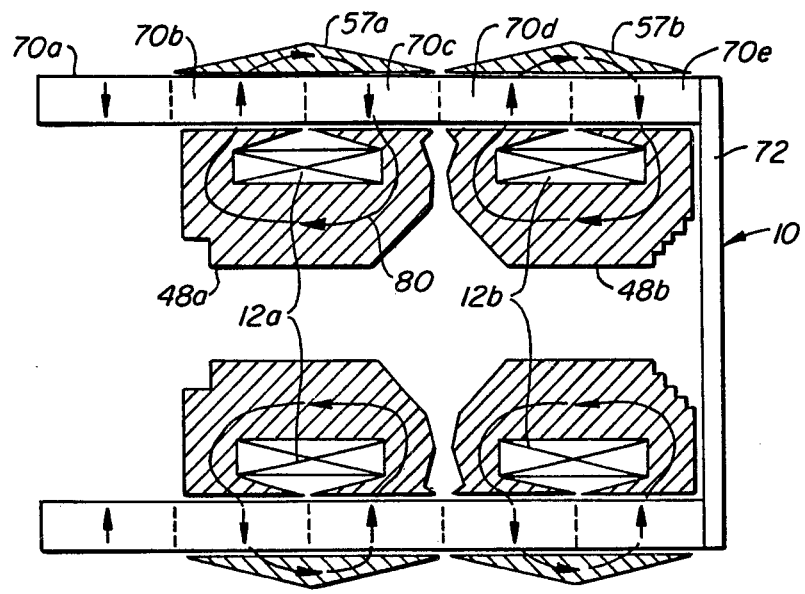
FIG._5A.
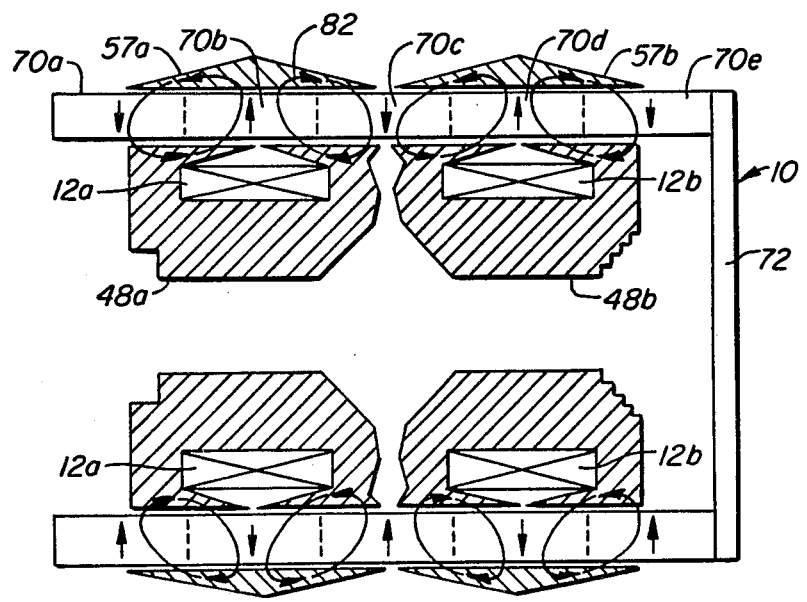
FIG._5B.

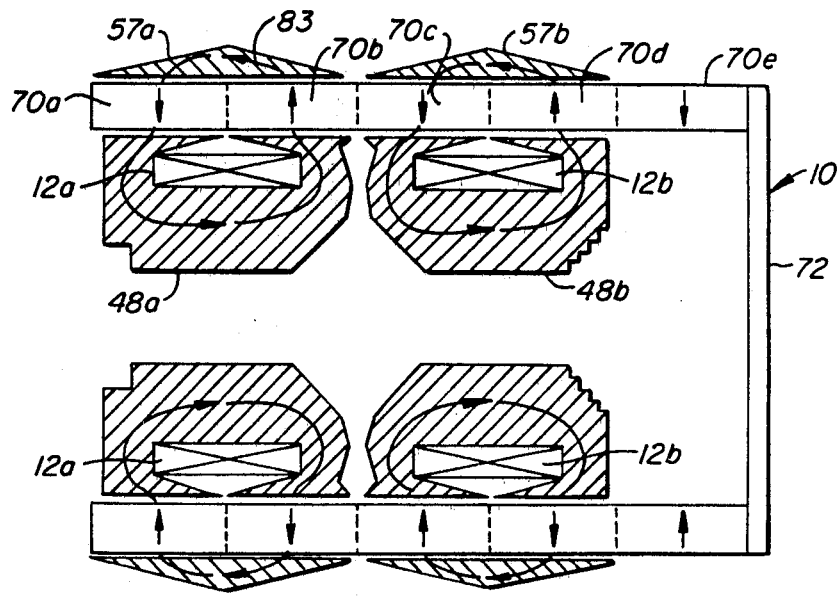
FIG._5C.
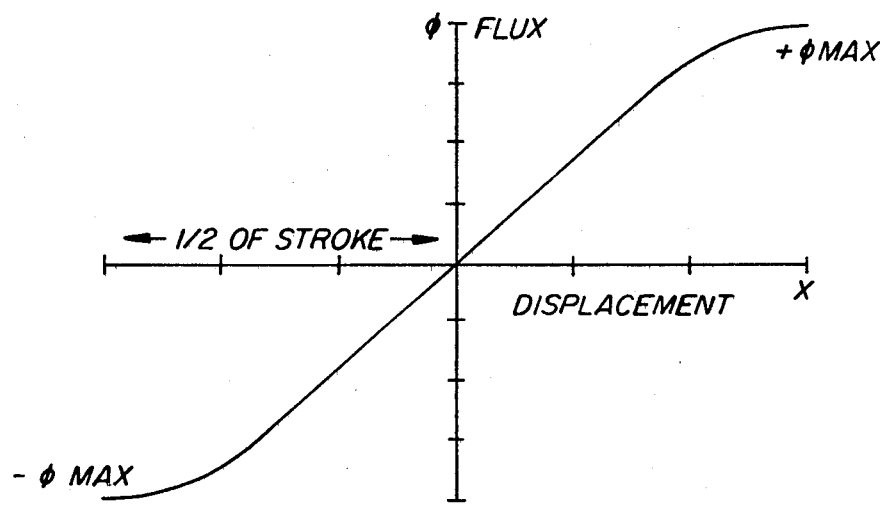
FIG._5D.

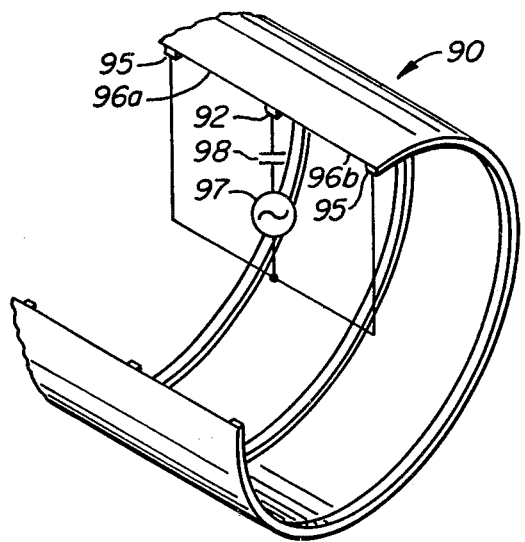
FIG._6A.
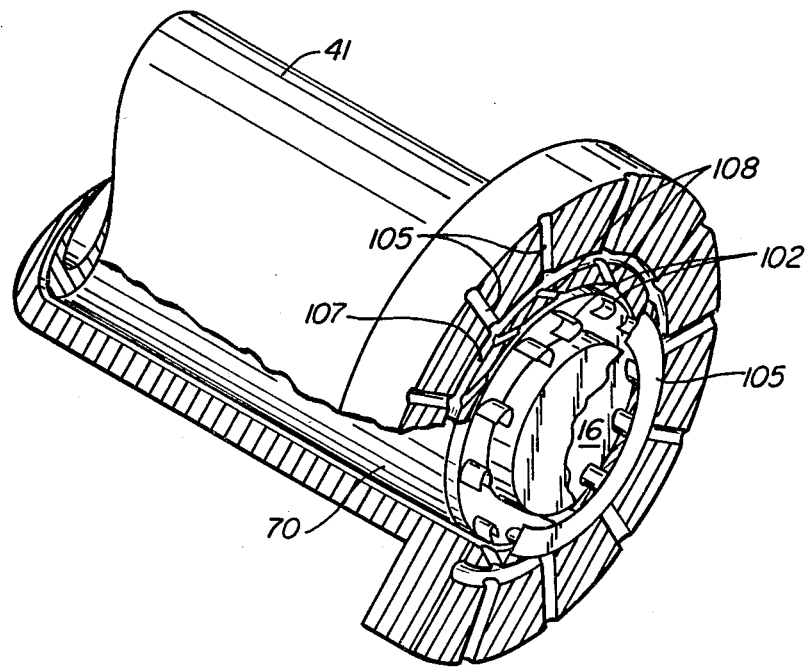
FIG._6B.

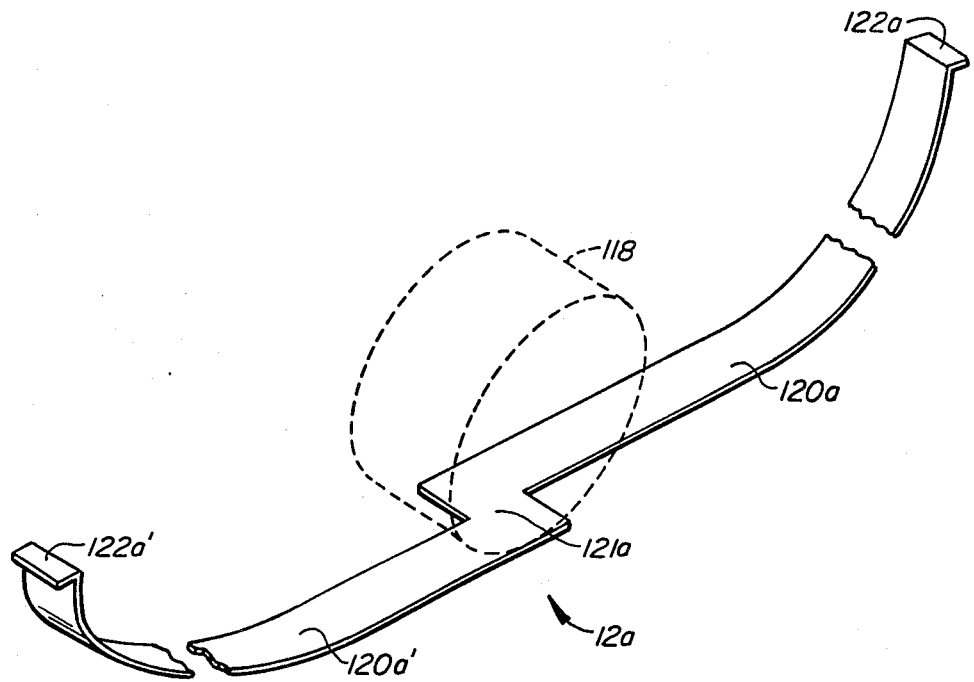
FIG._7A.
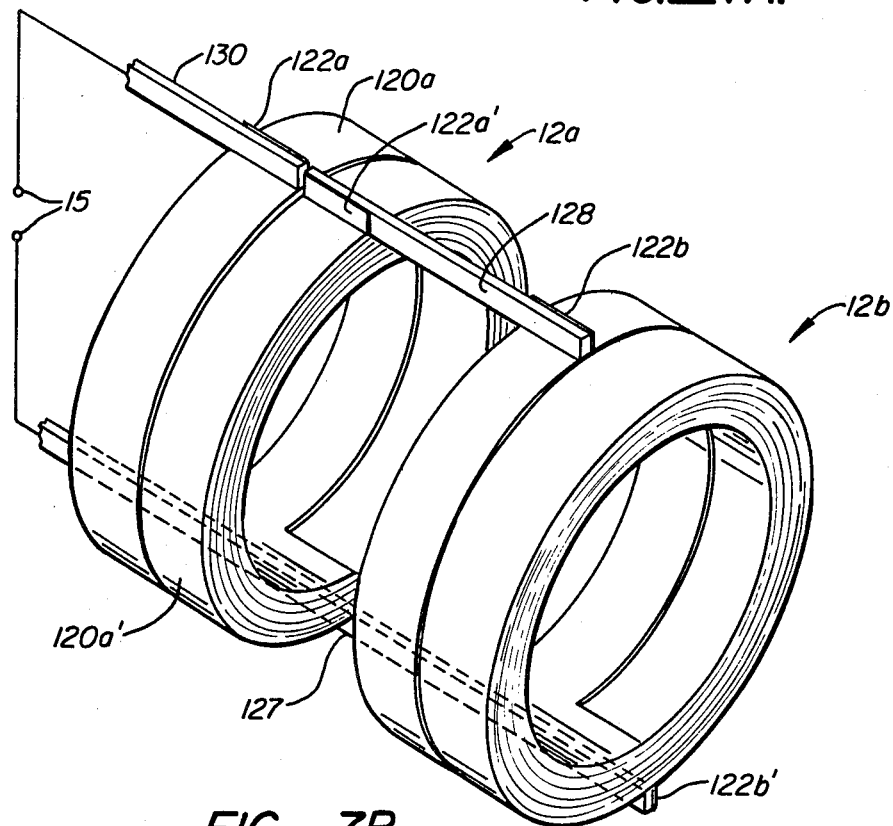
FIG._7B.

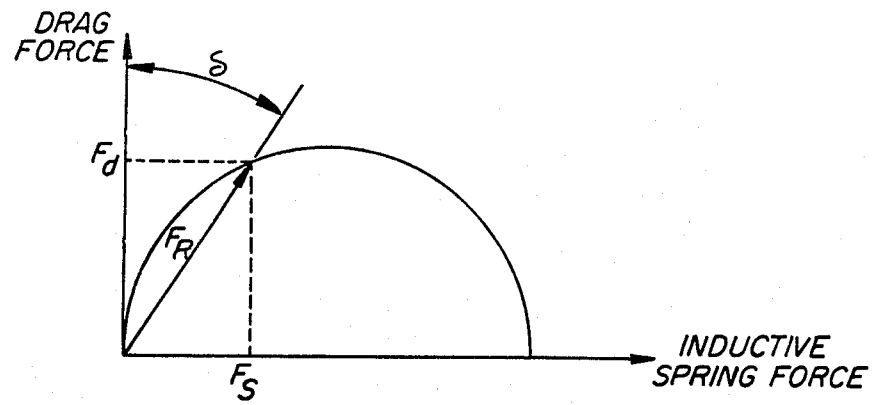
FIG._9.
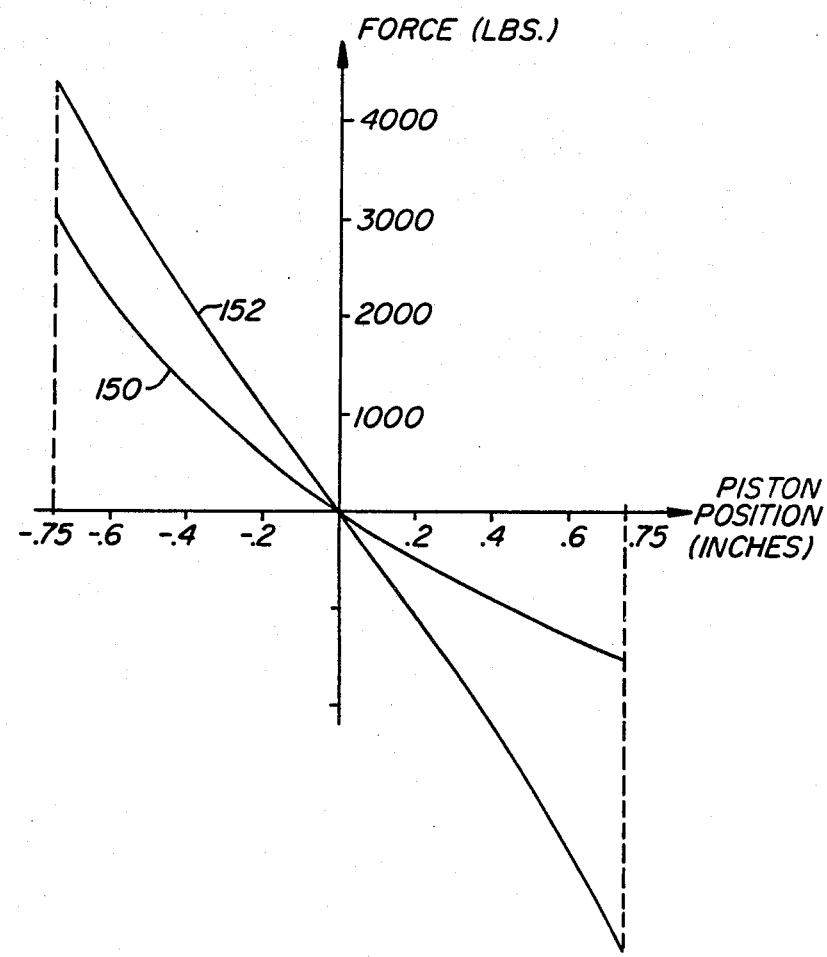
FIG._10A.

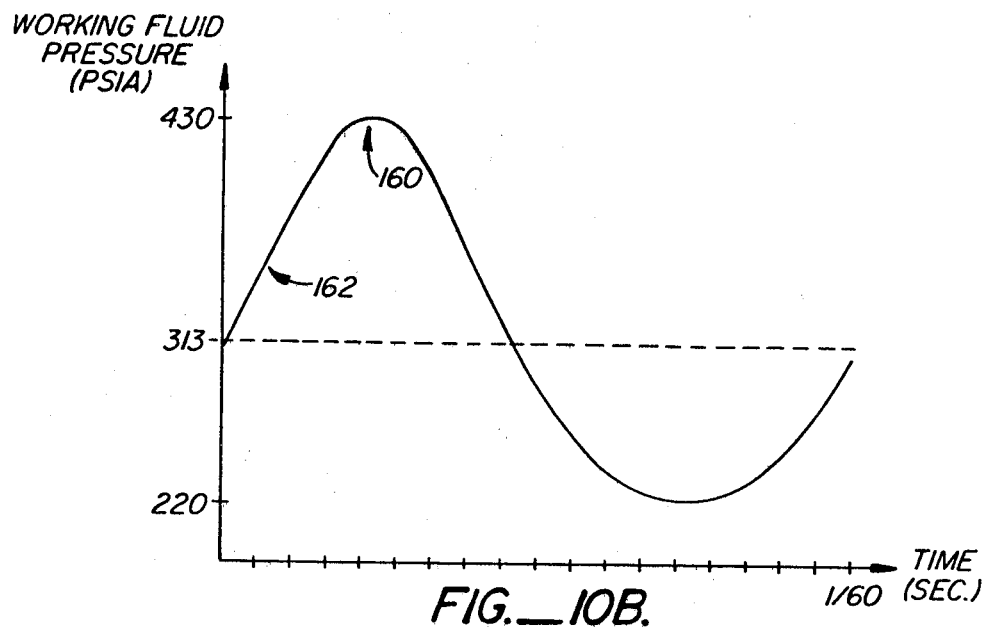
FIG._10B.
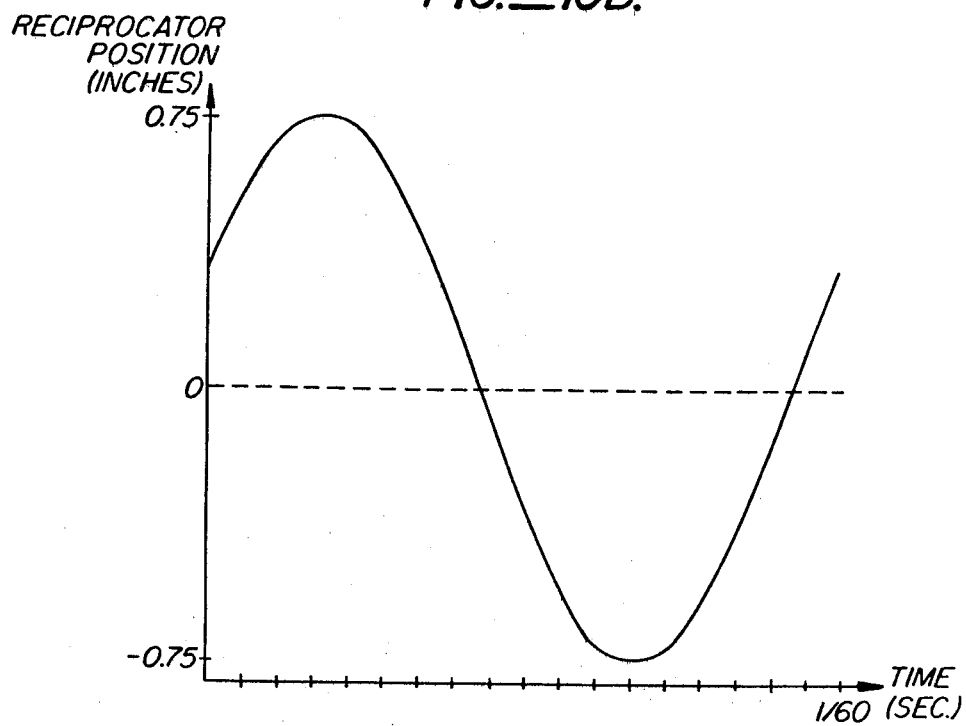
FIG._10C.

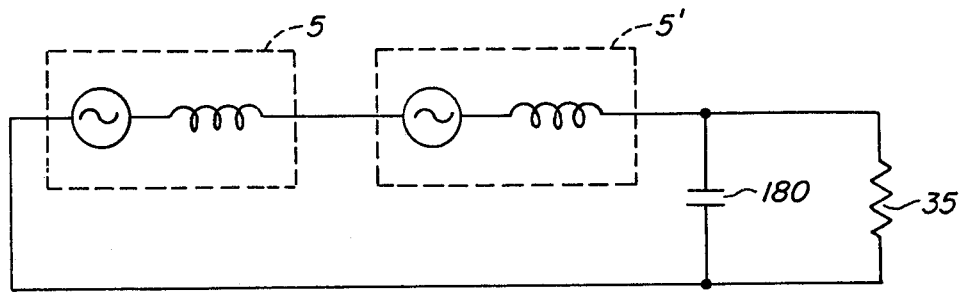
FIG._11.
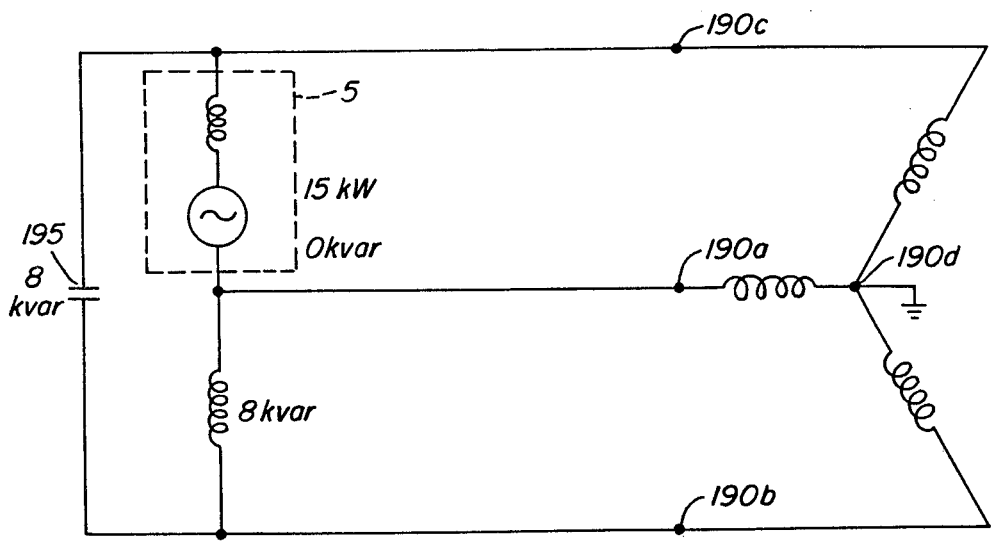
FIG._12.

LINEAR ELECTROMAGNETIC MACHINE

FIELD OF THE INVENTION

The present invention relates generally to electromagnetic machines which transform mechanical energy into electrical energy or vice versa, and more particularly to linear electromagnetic machines.

BACKGROUND OF THE INVENTION

The need for efficient conversion of electrical energy into mechanical energy or mechanical energy into electrical energy is so well established as to require no elaboration. The disscusion that follows will be in terms of engine-driven alternators, it being understood that the same general considerations apply to electric motors.

In many applications, the mechanical energy input is provided by the reciprocation of a positive displacement mechanical element such as the piston in a Diesel, Brayton, or Stirling engine. The most common alternators are rotary machines which utilize a kinematic converter to transform the reciprocal motion of the positive displacement element to the rotary motion required by the alternator. However, the kinematic converter is subject to parasitic friction and life-shortening wear, with most such converters requiring separate bearings and lubrication systems using specially formulated lubricants. Thus, the requirement of such a kinematic converter adds cost, weight, and bulk of the machine.

Furthermore rotary machines tend to be relatively heavy and inefficient. For example, a typical 10-kilowatt alternator is 12 inches in diameter, 18 inches in length, weighs approximately 100 pounds, and has an efficiency on the order of 80%. To be sure, there are rotary machines having a lower weight/power ratio and a higher efficiency, but the machines exhibiting these desirable characteristics tend to be central station machines in the 100 megawatt range.

Some of the above deficiencies may be eliminated by employing a linear configuration wherein a reciprocating electromagnetic element is directly connected to the positive displacement element of the free-piston engine. These linear electromagnetic machines may be classified generally into two groups. First, are the Henry-type machines in which the magnetic field reciprocates relative to an armature coil, thereby inducing voltage in the coil by the well-known Henry law of induction. Second, are the Faraday-type machines in which the magnetic flux imposed on the armature coil is made to vary periodically with time, thereby inducing voltage in the coil by the well known Faraday law of induction. The prior art is replete with examples of both types of machines.

Representative of Henry-type machines are those disclosed in the following U.S. Patents:
Ostenberg, U.S. Pat. No. 2,362,151
Martin, U.S. Pat. No. 2,842,688
Dickinson, U.S. Pat. No. 2,944,160
Stauder, U.S. Pat. No. 3,024,374
Cutkosky, U.S. Pat. No. 3,465,161.
Representative of Faraday-type machines are those described in the following U.S. Patents:
Christian, U.S. Pat. No. 2,928,959
Schmidt, et al., U.S. Pat. No. 2,992,342
Wysocki, U.S. Pat. No. 3,094,635
James, Jr., U.S. Pat. No. 3,105,153
Dawes, U.S. Pat. No. 3,206,609
Colgate, U.S. Pat. No. 3,234,395
Montpetit, et al., U.S. Pat. No. 3,443,111
Wills, U.S. Pat. No. 3,629,595.

However, while the elimination of the kinematic converter overcomes some of the problems discussed above, the voltage output of prior art linear alternators renders such machines unsuitable for certain applications. More particularly, any AC power generation equipment that is to be connected to a power grid must provide a substantially pure sinusoidal output waveform at precisely controlled frequency and phase. While the Faraday-type machines of the prior art tend to be simpler to construct than the Henry-type machines, they are variable reluctance machines which are subject to pronounced cogging action. This renders them very difficult to control with a free-piston engine, so that a sinusoidal output voltage is virtually unattainable.

SUMMARY OF THE INVENTION

The present invention provides a linear electromagnetic machine wherein even small versions possess the high efficiencies and low weight/power ratios that were heretofore attainable only in central station machines. In an illustrative embodiment, a 11.25-kilowatt machine according to the present invention weighs approximately 25 pounds and is 98% efficient. Moreover, the output waveform from an alternator embodiment of the present invention is substantially purely sinusoidal, and may be controlled to maintain constant frequency and voltage.

Broadly, the present invention is a constant reluctance Faraday-type machine. High efficiency and low weight are achieved by the use of a geometry in which the reciprocating element comprises a piston to which is mounted a tubular permanent magnet having multiple magnetic poles of alternating radial polarity. The permanent magnet reciprocates relative to radially inboard stator coils, thereby periodically reversing the magnet flux imposed on the coils to induce a sinusoidal output voltage. The use of a reciprocating permanent magnet provides a lighter weight system than if the coil were moved, and provides a lower reluctance since a moving coil would present a low permeability. In order to acheive suitable power levels, a moving coil design typically would require increased flux linkage which could be achieved either by providing more permanent magnet material or by adding iron teeth to the reciprocating element to reduce the reluctance. Locating the coils radially inboard of the permannt magnet reciprocator leads to greater efficiency since the coils require less cooper to provide the same number of coil turns. Thus there is less resistive heat loss for a given current density.

According to a further aspect of the present invention, torquing means subjects the permanent magnet reciprocator to a unidirectional torque to maintain rotation thereof. This generates a hydrodynamic fluid film which causes the magnet to float in the stator bore eithout contacting the walls. The torquing means may be electrical (torquing coil) or mechanical (turbine vanes on piston).

According to a further aspect of the invention, the permanent magnet reciprocates at a damped resonant frequency synchronous with the electric frequency. In an alternator embodiment, working fluid pressure fluctuations operate on one face of the piston, and a bounce fluid (gas spring) operates on the opposite face. The spring effect produced by the bounce gas and the working fluid, and the mass of the magnet/piston reciprocator define a spring-mass system having a characteristic natural frequency. The system includes means such as a servo-controlled bellows for varying the means pressure of the bounce gas and working fluid, and thus controlling the frequency. This permits very precise control of the frequency, while a small pressure impulse actuation of the bellows may be used to momentarily change the frequency and thus produces a phase shift of the electrical output relative to a fixed frequency standard. Thus, the electrical output of the alternator can be modulated and thereby phase locked to an electric grid.

The system frequency may be rendered substantially independent of load by the provision of a second servo-controlled bellows operative to change the volume of the bounce chamber in response to changes in the load. This compensates for the load-dependent inductive spring force that acts on the reciprocating permanant magnet. In order to maintain resonant mechanical oscillation at a fixed frequency, the spring coefficient of the bounce gas is reduced as the load (current) increases.

The stroke of the permanent magnet is determined by the load on the pressure means acting on the piston head. In the case of a free-piston engine driven alternator, the stroke of the permanent magnet may be varied by controlling the combustion of the fuel or the phase angle of the displacer depending on the nature of the engine. In this way, the voltage output may be maintained at a constant desired level.

The present invention further provides methods of synchronizing two or more reciprocating permanant magnets so that their respective outputs are either in phase, or phasespaced to permit polyphase electrical operation. Furthermore, a network is disclosed for interfacing a single-phase machine of the present invention to a three-phase load.

For a further understanding of the nature and advantages of the present invention, reference should be made to the remaining portions of the specification and to the attached drawings.

BRIEF DESCRIPTION OF THE DRAWINGS

FIG. 1 is a schematic view of a linear alternator and control system according to the present invention;

FIGS. 2A-B are electrical schematic and phasor diagrams for the linear alternator;

FIG. 2C is a plot of terminal voltage as a function of reactive voltage drop;

FIG. 3 is a sectioned oblique view of the alternator stator;

FIG. 4 is a sectioned oblique view of the alternator reciprocator;

FIGS. 5A-C are sectional views illustrating the magnetic circuit of the linear alternator;

FIG. 5D is a plot of the flux linking the coil as a function of the linear position of the reciprocator;

FIGS. 6A-B illustrate mechanisms for imparting rotation to the reciprocator;

FIGS. 7A-B show a preferred configuration for a foil-wound coil;

FIG. 8 is a plot of frequency as a function of mean pressure;

FIG. 9 is a plot of drag force as a function of inductive spring force;

FIGS. 10A-C are plots illustrating the linearity of the effective spring force as a function of piston position;

FIG. 11 is a schematic of a circuit for phase locking multiple alternators; and

FIG. 12 is a schematic of a circuit for interfacing to a three-phase network.

DETAILED DESCRIPTION OF THE INVENTION

Overview and General Principles of Operation

FIG. 1 is a schematic view of a system 2 including a linear alternator 5 with associated driving and control systems. In its broadest aspect, alternator 5 includes a permanent magnet reciprocator 10 which oscillates linearly with respect to stator mounted armature coils 12a and 12b to produce a sinusoidal output voltage at a set of output terminals 15. Reciprocator 10 includes a crown 16 which is acted upon by working fluid in a working fluid space 17 with pressure fluctuations being provided by any convenient pressure fluctuation source 18. In an illustrative system, this may be the displacer piston 20 of a free-piston Stirling engine. Typically, a single engine would drive two identical alternators in phase opposition to avoid mechanical imbalances.

The working fluid in working fluid space 17 acts on one face of piston crown 16 while bounce gas within a bounce chamber 22 acts on the opposite face. As will be discussed in greater detail below, the operating frequency controlled by a first servo-controlled bellows 25 which controls the means pressure within the working fluid and a second servo-controlled bellows 27 which controls the volume of bounce chamber 22 and the mean pressure within the bounce gas. Additionally, the stroke is controlled by a third servo-controlled bellows 28 which controls the volume of the displacer bounce chamber, designated 29.

Prior to describing the precise geometrical configuration of alternator 5, the electrical characteristics will be set forth. The linear reciprocating electromagnetic machine is closely analagous to the conventional rotating electrical machine for which a large body of theory and test results exists. The primary difference between the linear machine and the rotating one is the shape of the magnetic circuit and its influence on losses, reactances, and flux leakage. These differences may best be illustrated by considering an alternator embodiment as shown in FIG. 1 and as will be discussed below in detail, the design of the present invention is equally applicable to electric motors.

All alternators produce an alternating voltage which is sinusoidal in the ideal case. The voltage is produced by the changes of magnetic flux linking the coils of the machine, with the voltage resulting from the change of flux being found from the following well-known Faraday equation:

$$E = N\frac{d\phi}{dt} \times 10^{-8} \text{ volts} \quad (1)$$

where N=number of turns in coil.

A sinusoidal flux variation is required for a sinusoidal voltage.

In a rotary machine the coils rotate through a magnetic field having a flux density which varies with respect to the angular position. Thus, the variation in the flux linkage is found from the following equation.

$$\frac{d\phi}{dt} = \frac{d\theta}{dt} \frac{d\phi}{d\theta} \qquad (2)$$

where
($d\theta/dt$)=rotational velocity
($d\phi/d\theta$)=change of flux with respect to angular position.

Typically, the rotational velocity is constant and the change of angular flux with respect to position is designed to be as close to sinusoidal as possible.

For the linear alternator, the motion of the coil or other moving part is oscillatory and variation in flux linkage is found from the following equation:

$$\frac{d\phi}{dt} = \frac{dx}{dt} \frac{d\phi}{dx} \qquad (3)$$

where
(dx/dt)=velocity of reciprocator
($d\phi/dx$)=variation of flux with respect to linear position.

For a sinusoidal voltage waveform and a sinusoidal displacement, the variation of flux with respect to linear position must be a constant, that is, the flux $\phi$ must be a linear function of displacement. Non-linearities in the flux function may be compensated by corresponding departures from sinusoidal behavior in the displacement in order to achieve substantially sinusoidal voltage.

FIG. 2A is the simplified equivalent circuit for linear alternator 5. The alternator includes an ideal voltage generator 30 having an output voltage $E_G$ in series with the reactance $X_{coil}$ of armature coil 12. A resistive load 35 characterized by a resistance $R_{load}$ is coupled across output terminals 15. While the no-load voltage may be found from Equations 1 and 3 above, once current is drawn by a load, such current flowing in armature coil 12 produces a counter magnetomotive force (mmf) acting to oppose the permanent magnet flux. This counter mmf has a phase relationship to the permanent magnet mmf dependent upon the nature of the load. For a purely resistive load, the current is in phase with the voltage and the counter mmf is more than 90° out of phase with the permanent magnet mmf (the phase angle is 90+$\delta$). The armature current normally causes a reduction in flux and a corresponding reduction in voltage.

FIG. 2B is a phasor diagram illustrating the voltage change caused by armature current for a generalized load. The terminal volage $E_T$ and the no-load generator voltage $E_G$ are out of phase by a power angle $\delta$ while the terminal voltage and the current I are out of phase by a phase angle $\theta$ which is zero for a purely resistive load.

The resultant flux change is the vector sum of the variation due to motion and that due to armature current. The armature current is in phase with the armature voltage for a purely resistive load. A reactive component of the current lags or leads the voltage depending on the nature of the load. For an inductive reactance the current lags the voltage; for a capacitive reactance, the current leads the voltage. For a resistive load, the flux produced by the armature current results in a voltage vector which causes a decrease in terminal voltage so that as the armature current increases, the terminal voltage decreases. It will be appreciated that for a given frequency, the voltage $E_G$ will increase when the stroke increases.

FIG. 2C shows a plot of terminal voltage magnitude against reactive voltage drop. The plot is a quarter circle having radius $E_G$. By varying the resistance of the load, the power angle may be varied to maximize the power delivered to the load. The peak power point occurs for a power angle of 45°, the output voltage and current at this power angle being designated $E_{45°}$ and $I_{45°}$. It is noted that $E_{45°}=E_G/\sqrt{2}$. For resistive loads that draw a current greater than $I_{45°}$, the power is less than maximum power because the voltage drops off faster than the current increases. It is desirable that the alternator operate in the region where the current is less than $I_{45°}$. For currents in this operating range, the voltage varies between $E_{45°}$ and $E_O$. This variation in voltage may be avoided by having a variable stroke (see below) which would keep the voltage at a level less than $E_O$. Since some overload capacity is normally required, a rated power should be established at a level less than the maximum value. This condition is shown at a power angle $\delta$ less than 45°, the operating point being designated by a current $I_R$ and a terminal voltage $E_R$. To achieve good regulation, a variable stroke is used to keep the voltage at $E_R$ for loads drawing up to $I_R$, allowing regulation to deteriorate under overload conditions. Alternately, the voltage may be maintained at $E_{45°}$ at the full load range (zero to maximum power) by varying the stroke through a greater range (70.7%-100% of full stroke) and then allowing regulation to deteriorate under overload conditions while maintaining full stroke.

Geometrical and Material Design Considerations

As shown in Equations 1 and 3, the slope of the flux-vs.-displacement curve is a major factor for determining the no-load voltage of alternator 5. The maximum permanent magnet flux linking the coils may be expressed as follows:

$$\phi_m = F_l AB \qquad (4)$$

where
$\phi_m$=maximum flux (maxwells)
A=pole area (cm$^2$)
B=induction (gauss)
$F_l$=dimensionless leakage factor As will be seen below with reference to the preferred embodiment, the maximum slope at the midstroke position is approximately given by:

$$\left(\frac{d\phi}{dx}\right)_{midstroke} = 1.33 \frac{\phi_m}{x_m} \qquad (5)$$

where $x_m$=maximum displacement. For sinusoidal oscillation, the velocity at midstroke is given by:

$$\left(\frac{dx}{dt}\right)_{midstroke} = 2\pi f x_m \qquad (6)$$

where f=frequency of oscillation. The rms voltage may be determined by combining Equations 1, 3, 4, 5, and 6, and is given as follows:

$$E_{rms} = \frac{1.33}{\sqrt{2}} F_l AB \, 2\pi f N \times 10^{-8}$$

The voltage change caused by armature current was discussed in connection with FIGS. 2A-C. The relationship for the voltage component due to armature current can be found in terms of the flux change caused by the current. This flux, also designated $\phi$, is given as follows:

$$\frac{d\phi}{dt} = A\frac{dB}{dt} = \mu A F_s \frac{N}{L} \frac{dI}{dt} \quad (7)$$

where
 $\mu$ = magnet permeabilty
 $F_s$ = dimensionless armature flux fringe factor
 L = path length through magnet
 (dI/dt) = time rate of change of armature current.
For sinusoidal variation of the current, $$\left(\frac{dI}{dt}\right)_{midstroke} = 2\pi f I_O \quad (8)$$

where $I_O$ = current amplitude. The rms value of the induced voltage is as follows:

$$E_i = \frac{\mu A F_s N I_O 2\pi f}{\sqrt{2}} N \times 10^{-8} \quad (9)$$

Recalling that the maximum power occurs for $E_i = E_G/\sqrt{2}$, the value of $I_O$ at peak power is found from Equations 7 and 9, and the rms value of I is:

$$I_{rms} = \frac{1.33}{2}\frac{F_l}{F_s}\left(\frac{B}{\mu}\right)\frac{L}{N} = \frac{1.33}{2}\frac{F_l}{F_s}H\frac{L}{N} \quad (10)$$

The maximum power is this value of I times the terminal voltage $E_T = E_G/\sqrt{2}$, and noting that the product of A and L is the volume V of material, the maximum power is given by:

$$P_m = \left(\frac{1.33}{2}\right)^2 \frac{F_l^2}{F_s} 2\pi f(VBH) \times 10^{-8} \quad (11)$$

Thus, for a permanent magnet linear alternator, maximum power is directly proportional to the frequency, to the volume of permanent magnet material, and to the BH product of the magnet material. The maximum power is proportional to the square of the leakage factor so that flux leakage will greatly decrease the power. For example, a leakage of 20% ($F_l$=0.80) would reduce the maximum power by 36% relative to an ideal non-leakage design. Obviously, design configurations which have low leakage are desired since such designs make more effective use of the permanent magnet material and reduce the amount of permanent material required for a given power. The leakage flux is reduced by using designs with thin magnets which yield greater pole area for a given permanent magnet volume than do thick magnet configurations. Setting the iron core cross-sectional areas high enough to ensure flux densities well below saturation also reduces the flux leakage. As will be seen below, the configuration of the present invention achieves these benefits.

Geometrical Configuration

FIG. 3 is a sectioned oblique view illustrating a preferred geometrical configuration for the stator, designated generally by reference numeral 40. Stator 40 includes an outer cylindrical wall portion 41, a central portion 42 which carries coils 12a and 12b, and an annular end wall 43. Stator portions 41 and 42 define an annular bore 44 to accommodate reciprocation of the tubular permanent magnet (to be described below). Stator end wall 43 carries a cylindrical bellows housing 45, which accommodates bellows 27. The region of the bellows housing interior that is outside bellows 27 defines a portion of bounce chamber 22. Bellows housing 45 is formed with radial passageways 46 adjacent stator end wall 43 to provide fluid communication between bore 44 and the interior of bellows housing 45.

Coils 12a and 12b are copper foil-wound coils located within enclosures in respective iron core elements 48a and 48b. Core elements 48a and 48b are each of split construction to accommodate the respective foil wound coils. A preferred coil configuration will be described below. The core elements are shaped to minimize the amount of nonessential iron, being separated by an insulative spacer 50. A hollow titanium tie bolt 52 holds the core elements and spacer rigidly to bellows housing 45 in a coaxial relation thereto to define stator central portion 42. Outer stator portion 41 carries iron flux return elements 57a and 57b opposite the respective coils. The core elements and the flux return elements are of laminated construction, comprising tapered stamped silicon steel laminations. The construction is similar to that of transformers. Stator portions 41 and 43, and spacer 50 are made of any nonmagnetic structural material such as fiberglass or Micarta.

FIG. 4 is a sectioned oblique view of reciprocator 10. Reciprocator 10 includes a tubular permanent magnet 70 mounted coaxially to piston crown 16 and sized to reciprocate within annular bore 44. Magnet 70 is subdivided into five magnetic segments 70a–e of alternating radial polarity, the axial extent of the segments being such that the center-to-center segment spacing is one-half of the center-to-center coil spacing. When reciprocator 10 is in place within annular bore 44, bounce chamber 22 is formed. The bounce chamber is defined by the portion of bore 44 between magnet segment 70a and stator end wall 43, the region between piston crown 16 and core 48b, the hollow region of tie bolt 52, and the interior of bellows housing 45 except for the region occupied by bellows 27. The working fluid in working fluid space 17 is typically the same as the bounce fluid within bounce chamber 22, in which case the narrow clearance between the outer surface of tubular magnet 70 and the inner surface of stator outer portion 41 forms a gas seal.

FIGS. 5A–C illustrate in schematic sectioned form the flux coupling properties of the configuration described above. Broadly, the permanent magnet mmf couples to the magnetic circuit defined by the core elements and the flux return elements in a manner that varies as the reciprocator moves.

FIG. 5A shows reciprocator 10 in its leftmost (bottom dead center) position in which magnet segment 70a is completely disengaged from the magnetic circuit. Magnet segments 70b and 70c cooperate with core element 48a and flux return element 57a to form a low reluctance magnetic flux path 80 that completely encircles coil 12a while magnet segments 70d and 70e similarly cooperate with core element 48b and flux return element 57b.

FIG. 5B shows reciprocator 10 in its midstroke position wherein magnet segments 70b and 70d are directly opposite the coil centers. In this position, the low reluctance flux path 82 does not encircle coil 12a.

FIG. 5C shows reciprocator at its rightmost (top dead center) position in which segment 70e is disengaged from the magnetic circuit. Segments 70a and 70b cooperate with core element 48a and flux return element 57a to form a low reluctance flux path 83 that encircles coil 12a while segments 70c and 70d similarly cooperate with core element 48b and flux return element 57b. However, the direction of the flux is reversed with respect to that in the position of FIG. 5A.

FIG. 5D is a plot of the flux linking the coils as a function of reciprocator position. As can be seen, the flux curve is highly linear in the central region, with departures at the ends of stroke due to flux leakage.

The basic rationale of the geometrical configuration may now be seen. While from an electrical point of view, coils 12a and 12b could be located radially outboard of tubular magnet 70, such a configuration would require larger coils. However, for a given current density in the copper conductors of the coils, the ohmic heating losses are proportional to the weight of copper used. Thus, configurations which reduce the weight of copper not only save the cost of the copper, but also reduce the losses (if the current density is not raised). Similarly, configurations which reduce the iron in the magnetic circuit for a given flux density not only lower the weight but also reduce the eddy current and hysteresis losses in the core. Locating the coils and core elements radially inboard of the tubular magnet clearly leads to physically smaller elements. Moreover, in order to achieve designs with low copper and iron weights without having excessive flux leakage it is essential that the magnetic flux paths be short and the average flux density in the area inscribed by the coils be high. The configuration with the coils inside the magnet cylinder provides a higher flux density than would be provided for a configuration with the coil outside.

The preferred embodiment utilizes two coils and five magnet segments. It will be readily appreciated that an embodiment with a single coil and three magnet segments would work, but that an embodiment with a larger number of coils and segments provides better magnet utilization. Generally, for N coils there would be (2N+1) magnetic segments, but arrangments with more than about seven magnet segments do not appreciably improve the utilization factor beyond that of the preferred embodiment with five segments.

Magnet 70 is preferably made of a material which exhibits a linear demagnetization curve, such as exhibited by ceramic-10 and samarium-cobalt type permanent magnets. Typical specific weight values for these permanent magnets are 1 lb/kw for ceramic magnets and 0.3 lb/kw for samarium-cobalt magnets when operated at 60 Hz. Although samarium-cobalt would appear preferable on this basis, it is significantly more costly than ceramic materials, so that ceramic material is preferred.

Table 1 sets forth the representative dimensions and characterisitics for a relatively small unit according to the present invention.

TABLE 1

| Characteristics of Linear Alternator | | |
|---|---|---|
| Voltage | 240 | volts |
| Rated Power | 7,500 | watts |
| Maximum Power | 11,250 | watts |
| Stroke | 1.5 | inches |
| Frequency | 60 | Hz |
| Permanent Magnet Material | Ceramic 10 | |
| Permanent Magnet Thickness | 0.6 | inches |
| Permanent Magnet Area/segment | 18.7 | inch$^2$ |
| Permanent Magnet Mean Radius | 2.2 | inches |
| Permanent Axial Length | 7.35 | inches |
| (1.35 inch segments; 0.15 inch transitions) | | |
| Coil turns | 52 | turns |
| Weights: | | |
| Permanent Magnets | 11 | lb |
| Iron Cores | 11 | lb |
| Copper Coil | 3 | lb |
| Total | 25 | lb |

| | Rated Power | Max Power |
|---|---|---|
| Losses: | | |
| Copper | 40.3 w | 161.2 w |
| Iron | 27.8 w | 27.8 w |
| Total | 68.1 w | 189.0 w |
| Efficiency | 99% | 98% |
| Specific Weight | 3.3 lb/kw | 2.2 lb/kw |

FIGS. 6A and 6B illustrate alternate techniques for exerting a unidirectional torque on reciprocator 10. The purpose of exerting this torque is to impart unidirectional rotation to the reciprocator so that a hydrodynamic fluid film is generated to keep the reciprocator from frictionally engaging the walls of annular bore 44.

FIG. 6A illustrates a stator mounted torquing conductor 90 in which axially flowing alternating current is caused to flow synchronously with the reciprocator motion, and interact with the permanent magnet segments to induce the desired torque. Conductor 90 preferably comprises a very thin sheet of copper which is mounted to stator central portion 42, and carries a central circumferentially extending bus connection 92 and a pair of outer circumferentially extending bus connections 95, thus defining first and second conductor segments 96a and 96b. Central bus connection 92 is axially located opposite the coil center. Conductor 90 typically has an angular extent of 360° around stator central portion 42. It should, however, be understood that current will flow axially in response to an impressed voltage between the common central bus connection and the outer bus connections. An AC voltage derived from the coil voltage is applied between bus connection 92 and bus connections 95. This voltage is applied through a capacitor 98. Assume, for example, that the current is flowing away from central bus connection 92 when the reciprocator is in the position of FIG. 5A. When the reciprocator is in the position of FIG. 5C, the current would be flowing toward the center bus connection. However, this 180° reversal of the current polarity is also accompanied by a shift in the magnet position so that the torque is unidirectional. The magnitude of the torque will depend on the amplitude and phase of the current flow through conductor 90. Since the copper sheet material is typically only a few mils in thickness, the resistance is sufficiently high that the full coil voltage may be applied. Otherwise, any convenient voltage derived from the output voltage may be utilized. While the illustrated embodiment utilizes a torquing conductor that is radially inboard of the reciprocator, it should be understood that an embodiment having the torquing conductor radially outboard of the tubular magnet is generally equally viable, although it is no longer possible to directly connect the conductor to the armature coils.

FIG. 6B illustrates an alternate technique for imparting the unidirectional torque utilizing a turbine drive mechanism wherein the working fluid is utilized to impart the torque. The clearance between tubular magnet 70 and outer stator portion 41 is somewhat exaggerated for clarity. Piston crown 16 is fitted with a vaned impeller comprising a plurality of impulse turbine blades 102 and a reinforcing ring 105. Outer stator wall 41 is formed with a plurality of radially extending fluid ports 105, an internal manifold 107, and a plurality of obliquely extending nozzle passageways 108 communicating to the interior of working fluid space 17. Incoming working fluid flows through fluid ports 105 into manifold 107, and then through nozzles 108 to impinge on turbine blades 102 to impart rotation to the reciprocator. The nozzles are located so as to engage the turbine blades near top dead center.

Alternately, the reciprocator may be floated in the stator bore by the use of a hydrostatic fluid bearing that is provided by orifices 110, shown in FIG. 3, opposite the tubular magnet. Pressurized fluid may be injected through these orifices during start up until hydrodynamic action is sufficient to continue floating the permanent magnet.

FIGS. 7A and 7B illustrate a preferred configuration for the copper foil-wound coils 12a and 12b. FIG. 7A shows the conductor for coil 12a prior to the coil's being wound on a suitable mandrel 118, shown in phantom. The coil conductor is generally Z-shaped having parallel strip portions 120a and 120a' which are offset by a distance slightly greater than the strip width. The strip portions are joined at a central stepped portion 121a. Strip portions 120a and 120a' are formed at their remote ends with respective connection tabs 122a and 122a'. Central stepped portion 121a defines the radially innermost portion of the coil, and the two strip portions extending away therefrom are wound in opposite directions on the cylindrical mandrel surface. When the coil is wound, tabs 122a and 122a' protrude from the radially outermost coil surface, and thus present the connection points for the coil. It will be appreciated that current flowing between connection tabs 122a and 122a' flows in the same direction over both strip portions of the coil, initially flowing in strip portion 120a, spiralling radially inward, and then in strip portion 120a', spiralling radially outward, but with the same angular sense.

FIG. 7B shows the bus connections to the wound coils. Corresponding reference numerals are used for coil 12b except that elements have the alphabetic designator "b." The lengths of the strip portions are chosen so that once the coils are wound, connector tabs 122a and 122a' are located generally proximate one another while tabs 122b and 122b' are located on opposite sides of coil 12b. For a series connection of coils 12a and 12b, a first axially extending bus bar 127 is connected to connection tab 122b', a second axially extending bus bar 128 is connected between connection tabs 122b and 122a', and a third axially extending bus bar 130 is connected to connection tab 122a. Core elements 48a and 48b, spacer 50, and bellows housing 45 are provided with appropriate grooves to accomodate the bus bars, with appropriate electrical insulation preventing any current flow other than through the series-connected coils.

Operation and Control

Broadly, the control system incorporates multiple feedback loops, with the primary controlled variables being frequency, output voltage, and, where appropriate, engine temperature. The manipulated variables are engine mean pressure, the volume of bounce chamber 22, the volume of displacer bounce chamber 29, and a displacer damping rate (to be discussed below). Additionally, either the rate of heat input into the engine or the power output from the engine would be considered manipulated variables.

The spring effect produced by the bounce gas and working fluid, and the mass of reciprocator 10 define a spring-mass system having a characteristic natural frequency. This frequency may be increased by either reducing the mass of the reciprocator or by increasing the effective spring coefficient of the bounce gas and working fluid. As a practical matter, the frequency is most easily controlled by changing the effective spring coefficient of the working and bounce fluids. This is accomplished by varying the mean pressure in both fluids, it being understood that both fluids should have the same mean pressure in order that the reciprocator not experience unidirectional motion toward one end or the other of the unit. FIG. 8 is a plot of oscillation frequency as a function of mean pressure for frequencies in the neighborhood of 60 Hz, the design frequency for coupling to an AC grid.

As discussed above, the mean pressure in working fluid space 17 and the mean pressure and volume of bounce chamber 22 may be varied by varying the settings of bellows 25 and 27. The setting of bellows 25 is controlled by a first servo-controlled plunger mechanism 140 while the setting of bellows 27 is controlled by a second servo-controlled plunger mechanism 142. Plunger mechanisms 140 and 142 are controlled by signals from appropriate frequency control circuitry 145 which monitors the AC output at output terminals 15 and the AC from a frequency standard such as the power grid to maintain the frequency in synchronous relationship. The phase may be shifted if necessary by momentarily changing the spring coefficient to momentarily change the frequency, thus producing a net phase shift of desired magnitude.

In addition to the gas spring forces acting on reciprocator 10, the linear electromagnetic machine of the present invention exhibits a total reactive force Fr acting on the reciprocator in phase with the armature current. One component is the drag force associated with the alternator (or the driving force in a motor embodiment). The other component is the inductive spring force. The drag force is in phase with the internal emf while the inductive spring force lags by 90°. FIG. 9 is a plot of the drag force, plotted on a vertical axis, as a function of the inductive spring force, plotted on a horizontal axis. In order to maintain resonant mechanical oscillation at a fixed frequency (to match the line frequency), the spring force associated with bounce chamber 22 must be reduced as the load (current) increases. This may be accomplished by varying the volume of bounce chamber 22 as determined by the setting of bellows 27. Bellows 27 is fully extended at no load, partially collapsed at peak load, and fully collapsed for a short circuit condition.

As discussed above, the degree to which the oscillation of reciprocator 10 is sinusoidal is determined by the linearity of the total effective gas spring force as a function of position. FIG. 10A shows plots of force versus reciprocator position, with the origin taken at zero force and midstroke. A first plot 150 shows the force exerted by the bounce gas in chamber 22, normalized to pass through the origin. This curve is highly nonlinear. A second plot 152 shows the additive effect of the bounce gas force and the working gas force, and it can be seen that this curve is more nearly linear with the non-linearity compensating for the non-linearity of the flux curve. Both curves are for the bounce gas and working gas pressure ratio equal to 1.931.

FIG. 10B is a plot of working fluid pressure over a cycle. The curve is not sinusoidal, but rather the high pressure portion of the cycle is shorter than the low pressure portion of the cycle. The peak of the pressure, designated 160 corresponds to the reciprocator top dead center (rightmost position) at no load, while a point, designated 162, on the rise of the pressure curve, corresponds to the reciprocator top dead center position at full load. FIG. 10C is a plot of the resultant power piston motion for an intermediate load, and it can be seen that the motion is more nearly sinusoidal, even though the working fluid pressure wave is highly non-sinusoidal.

As discussed above, voltage regulation in the desired operating range is maintained by controlling the stroke of reciprocator 10. The stroke is determined by the load on the pressure generating means, in the illustrative embodiment the displacer piston of a Stirling engine. As is known regarding Stirling engine behavior, the stroke and phase of the displacer motion are extremely important, thermodynamically, in determining the behavior of the power piston, in this case, reciprocator 10. A typical engine design is characterized by a displacer frequency ratio of approximately 0.98, as determined by the mass of displacer 20 and the effective spring rate of displacer bounce chamber 29. Due to low regenerator pressure drop, the damping ratio is less than 0.1, so that displacer motion is very sensitive to small changes in frequency and damping ratio. As load decreases, the displacer phase angle increases towards 180° in order to drop the power output of the engine, while piston stroke remains relatively high. In this way, constant output voltage is available from the alternator, even at low power levels. At very low power levels, a small amount of negative displacer damping is typically necessary to achieve the desired stroke and phase angle.

The frequency may be controlled by changing the effective spring rate of bounce chamber 29, as determined by the setting of bellows 28 which is controlled by a servo-controlled plunger mechanism 170. The damping parameter may be controlled by coupling displacer 20 to an alternator and drawing varying amounts of current therefrom. This alternator may be configured along the lines of alternator 5, in which case displacer 20 carries a tubular magnet 172 which interacts with a fixed coil 175. This is shown schematically in FIG. 1. Appropriate stroke control circuitry 177 senses the voltage at output terminals 15, and changes the setting of plunger mechanism 170 and the load on coil 175 as required.

The active volume of bounce chamber 22 must decrease as load decreases to maintain operation at the 60 Hz design frequency. The inductive spring constant decreases with load, and this drop in spring constant must be countered by increasing the pressure ratio and spring constant of the bounce gas. In addition, a decrease in piston stroke causes a small reduction in equivalent spring rate because of non-linear gas behavior. This effect is also accommodated by changing the bounce chamber volume.

The wide range of control options available indicates that the transient response of the system may be tailored to suit necessary requirements, and while a Stirling engine is inherently stable, the overall system's stability and transient response is largely determined by the feedback control system. The particular control circuitry and algorithms are generally familiar to those skilled in the art. It is noted that a microprocessor controller would typically be preferred, although it is possible to implement suitable control logic in discrete form.

In some applications, it is desired to operate a number of alternators in phase-locked relationship, whether or not driven from the same pressure variation source. This may be accomplished as shown in FIG. 11 by connecting the terminals of multiple alternators (5, 5') in series, and connecting a capacitor 180 across the output terminals of the series combination. Load 35 is connected across capacitor 180. The capacitor is selected such that the inductance of the series-connected alternators and the overall capacitance of the circuit form a resonant circuit having a resonant frequency equal to that of the mechanical system. The energy transfer produced when the inductance in the resonant circuit is forcibly oscillated is well known, and this energy transfer produces a synchronizing force that phase-locks each of the reciprocating permanent magnets. The phase-locking may be further assisted by having the bounce chambers for the various alternators in fluid communication with one another.

While the linear electromagnetic machine of the present invention is a single-phase device, it is possible to utilize it in connection with a three-phase electrical network. A first method utilizes three separate linear machines, each connected to one leg of the three-phase network, with each machine phase-spaced at a constant 120° relative phase angle by trim-controlling its frequency, utilizing the control bellows as described above. A second method also employs three separate linear machines, each connected to one leg of the three-phase network, with each machine phase-spaced at a constant 120° relative phase by modulating the frequency through timing of the pressure means.

FIG. 12 shows a third method which utilizes but a single machine coupled to a three-phase network. The three terminals of the network are designated 190a, 190b, and 190c, with an optional ground point being designated 190d. While a wye connection is shown, a Δ connection could also be used. Alternator 5 is connected in series with an inductance 192, with a capacitor 195 being connected across the series combination. The common terminal between alternator 5 and inductor 192 is connected to network 190a, while the terminals of the capacitor 195 are connected to network terminals 190b and 190c. The capacitor and inductor are each sized to have power ratings approximately 53% of that of the alternator. The three-phase output remains phase-locked, independent of load drawn by three-phase system. Such a transformation system can also be used for a linear motor according to the present invention.

Conclusion

In summary it can be seen that the present invention provides a highly compact and efficient design for a linear electromagnetic machine having a low weight/power ratio rivaling that of much larger rotary machines. The radially poled tubular magnet reciprocator oscillates at a damped resonant frequency which permits the frequency, stroke, and phase to be easily controlled so that even small machines are suitable for connection to a power grid. The integral torquing means provides a method for using a working or bounce fluid for self-acting bearings for support and sealing.

While the above provides a full and complete disclosure of the preferred embodiment of the present invention, various modifications, alternate contructions, and equivalents may be employed without departing from the true spirit and scope of the invention. It has already been mentioned that while an alternator embodiment is disclosed, the present invention applies to AC linear motors. Additionally, while parameters for a relatively small machine are set forth, the design scales with the power output being proportional to the cube of the scaling dimension, so that comparable weight/power ratios are achieved for varying sizes. Therefore, the above description should not be construed as limiting the scope of the invention as defined by the appended claims.

I claim:

1. A linear electromagnetic machine comprising:
    means defining a stator;
    a coil mounted on said stator;
    a reciprocating element having permanent magnet material with magnetized segments of alternating polarity so that reciprocation of said element relative to said stator in an axial direction causes periodic flux reversal through said coil to induce an alternating voltage therein, said magnetized segments being of equal axial extent and being axially spaced by transitional regions that are of axial extent substantially less than that of said magnetized segments; and
    flux return means associated with said stator for providing a relatively low reluctance magnetic path for flux lines resulting from the magnetization of said permanent magnet material wherein the reluctance is generally independent of the position of said reciprocating element.

2. The invention of claim 1 wherein said stator carries N axially aligned coils at a predetermined center-to-center spacing and wherein said segments on said reciprocating element are disposed at intervals one-half said predetermined center-to-center spacing.

3. The invention of claim 1 wherein the permanent magnet material on said reciprocating element is in the form of a cylindrical shell, and wherein said segments of alternating polarity are radially polarized.

4. The invention of claim 3, and further comprising means for imparting a unidirectional torque to said reciprocating element to provide a hydrodynamic fluid film to prevent said reciprocator from contacting said stator.

5. An electromagnetic machine comprising:
    a stator defining an annular bore, the central region of said stator including at least one coil mounted axially with respect to said bore and radially inboard therefrom;
    a reciprocating element including a tubular permanent magnet having multiple magnetic poles of alternating radial polarity;
    means defining a gas spring acting on said reciprocating element, the effective spring coefficient of said gas spring and the mass of said reciprocating element defining a resonant frequency; and
    means for varying said effective spring coefficient to permit control of the operating frequency.

6. The invention of claim 5 wherein said means defining a gas spring comprises:
    a working fluid chamber in fluid communication with a first side of said reciprocating element; and
    a bounce fluid chamber in fluid communication with a second side of said reciprocating element.

7. The invention of claim 6 wherein said means for varying said effective spring coefficient comprises:
    means for varying the mean pressure in said working fluid chamber; and
    means for varying the mean pressure in said bounce fluid chamber.

8. The invention of claim 7 wherein said means for varying the mean pressure in said bounce fluid chamber comprises:
    a bellows having a movable wall with first and second oppositely facing surfaces, said first surface being in fluid communication with said bounce fluid chamber such that movement of said wall causes a change of the volume of said bounce fluid chamber;
    a servo-controlled plunger;
    means defining a fluid volume between a face of said plunger and said second surface of said movable wall, such that when said fluid volume is filled with incompressible fluid, movement of said plunger causes a corresponding movement of said movable wall to cause a corresponding change in the volume of said bounce gas chamber; and
    means for moving said plunger in response to a signal representative of a difference in frequency between a reference frequency and said operating frequency, whereupon said operating frequency may be brought into correspondence with said reference frequency.

9. Apparatus for generating an alternating voltage output comprising:
    means defining a stator;
    a coil mounted on said stator;
    a reciprocating element having permanent magnet material with segments of alternating polarity so that reciprocation of said element relative to said stator causes periodic flux reversal through said coil to induce an alternating voltage therein;
    flux return means associated with said stator defining a relatively low reluctance magnetic path wherein the reluctance is generally independent of the position of said reciprocating element;
    a Stirling engine having a displacer piston;
    means defining a working fluid chamber in fluid communication with a first side of said displacer piston and with a first side of said reciprocating element;
    means defining a bounce fluid chamber in fluid commmunication with a second side of said reciprocating element;
    said working fluid chamber and said bounce fluid chamber defining a gas spring acting on said reciprocating element;
    the effective spring coefficient of said gas spring and the mass of said reciprocating element defining a resonant frequency;
    means for varying said effective spring coefficient in response to feedback signals representative of the phase and frequency relationship between said alternating voltage and a standard alternating voltage to permit control of the operating frequency; and means responsive to the voltage output of said apparatus for providing variable damping of said Stirling engine displacer;

whereupon the stroke of said displacer may be varied to maintain voltage regulation of said output.

10. The invention of claim 9 wherein said means for varying said effective spring coefficient comprises:

means for varying the mean pressure in said working fluid chamber; and means for varying the mean pressure in said bounce fluid chamber.

11. The invention of claim 9 wherein said means for providing damping comprises:

means defining a second stator;

a second coil mounted on said second stator;

a second reciprocating element having permanent magnet material with segments of alternating polarity, said second reciprocating element being rigidly coupled to said displacer piston so that reciprocation of said displacer relative to said second stator causes periodic flux reversal through said second coil to induce an alternating voltage therein; and means for coupling said second coil to a controlled load so that variable current may be drawn through said second coil.

12. A linear electromagnetic machine comprising:

means defining a stator;

a plurality of coils mounted on said stator and disposed at a predetermined center-to-center axial spacing;

a reciprocating element having permanent magnet material with magnetized segments of alternating polarity, said segments being disposed at one-half said predetermined center-to-center axial spacing, so that reciprocation of said element relative to said stator causes periodic flux reversal through said coils to induce an alternating voltage therein; and flux return means associated with said stator for providing a relatively low reluctance magnetic path for flux lines resulting from the magnetization of said permanent magnet material wherein the reluctance is generally independent of the position of said reciprocating element.

13. The invention of claim 12 wherein said stator carries N axially aligned coils, and wherein said reciprocating element has (2N+1) segments.

14. The invention of claim 13 wherein the permanent magnet material on said reciprocating element is in the form of a cylindrical shell, and wherein said segments of alternating polarity are radially polarized.

15. The invention of claim 14 and further comprising means for imparting a unidirectional torque to said reciprocating element to provide a hydrodynamic fluid film to prevent said reciprocator from contacting said stator.

16. A linear electromagnetic machine comprising:

a stator defining an annular bore;

a plurality of coils mounted to said stator and disposed at a center-to-center axial spacing therealong and radially inboard from said bore;

a reciprocating element having permanently magnetized cylindrical segments of alternating polarity, which segments are disposed at one-half the center-to-center spacing of said coils, so that axial reciprocation of said reciprocating element relative to said stator causes periodic flux reversal through said coils to induce an alternating voltage therein; and flux return means associated with said stator for providing a relatively low reluctance magnetic path for the flux lines resulting from the magnetization of said reciprocating element wherein the reluctance is generally independent of the position of said reciprocating element.

17. The invention of claim 16 wherein said magnetized segments are separated by transitional regions having an axial dimension small compared to the axial dimension of said segments.

* * * * *